United States Patent [19]
Isler et al.

[11] Patent Number: 5,511,843
[45] Date of Patent: Apr. 30, 1996

[54] SLANT RAIL TONNEAU COVER

[75] Inventors: Mark B. Isler, Lordstown; Lawrence D. Saxon, Warren; Wayne Reinhart, Jr.; Kevin Batchelder, both of Lordstown, all of Ohio

[73] Assignee: Sport Masters, Inc., Lordstown, Ohio

[21] Appl. No.: 347,678

[22] Filed: Dec. 1, 1994

[51] Int. Cl.⁶ .................................................. B60P 7/04
[52] U.S. Cl. .................................................... 296/100
[58] Field of Search .................................. 296/100, 118

[56] References Cited

U.S. PATENT DOCUMENTS

| | | | |
|---|---|---|---|
| 3,894,766 | 7/1975 | Woodward | 296/104 |
| 4,730,866 | 3/1988 | Nett | 296/100 |
| 4,762,360 | 8/1988 | Huber | 296/100 |
| 4,792,178 | 12/1988 | Kokx | 296/98 |
| 4,941,705 | 7/1990 | Wurtz | 296/100 |
| 5,121,960 | 6/1992 | Wheatley | 296/100 |
| 5,152,574 | 10/1992 | Tucker | 296/100 |
| 5,251,951 | 10/1993 | Wheatley | 296/100 |
| 5,261,719 | 11/1993 | Tucker | 296/100 |
| 5,301,995 | 4/1994 | Isler | 296/100 |

Primary Examiner—Joseph D. Pape
Attorney, Agent, or Firm—Harpman & Harpman

[57] ABSTRACT

A tonneau cover assembly for use on pick-up trucks to provide a removable cover over the truck bed. The tonneau cover assembly has an aluminum slant side rail perimeter frame removable secured to the truck bed with interengaging multiple support bows extending transversely between opposing rails to support a removable fabric tonneau cover secured to adjustable snap fasteners positioned within the slant side rails.

4 Claims, 3 Drawing Sheets

SLANT RAIL TONNEAU COVER

BACKGROUND OF THE INVENTION

1. Technical Field

This device relates to tonneau covers for trucks and the like that use lightweight removable perimeter side rail frames on the truck beds with cross supports over which a flexible lightweight typically fabric cover is secured to the perimeter side rails providing a closure for the truck bed.

2. Description of Prior Art

Prior art devices of this type have used a number of different frame and cover configurations to address the inherent disadvantages of an open truck bed that is exposed to the weather and the security issues in which a covered bed conceals cargo within and provides weather protection. Additionally, a tonneau cover provides for a more aerodynamic vehicle enhancing fuel economy as well. Prior art cover assemblies of this type for example can be seen in U.S. Pat. Nos. 3,894,766, 4,762,360, 4,792,178 and applicant's own U.S. Pat. No. 5,301,995.

In U.S. Pat. No. 3,894,766 a cargo carrying vehicle is disclosed which shows a quickly removable two-part stake for flatbed cargo carrying vehicle. The device shows both segments extending between oppositely disposed posts with interconnecting piece therebetween.

In U.S. Pat. No. 4,762,360 a demountable pick-up truck tonneau cover is disclosed which shows a frame configuration which is removably secured to the sidewalls of a pick-up bed.

In U.S. Pat. No. 4,792,178 a truck tonneau cover assembly is disclosed which shows a pair of oppositely disposed tracks in which a fabric tonneau cover is guided over multiply positioned bow elements.

Finally, in applicant's own U.S. Pat. No. 5,301,995 a rail assembly for a tonneau cover is disclosed which shows the utilization of an adjustable bow elements extending between oppositely disposed extruded aluminum rail sections which are removably mounted on the side walls of a truck bed.

SUMMARY OF THE INVENTION

A slant rail tonneau cover assembly that provides a removable perimeter multiple rail frame with adjustably positioned snap fasteners within. The rails have resilient bow retaining fittings with corner connectors between the rail segments to form the perimeter rail frame that is removably positioned around the walls of a pick-up truck's cargo bed.

DESCRIPTION OF THE PREFERRED EMBODIMENT

Figure 1:
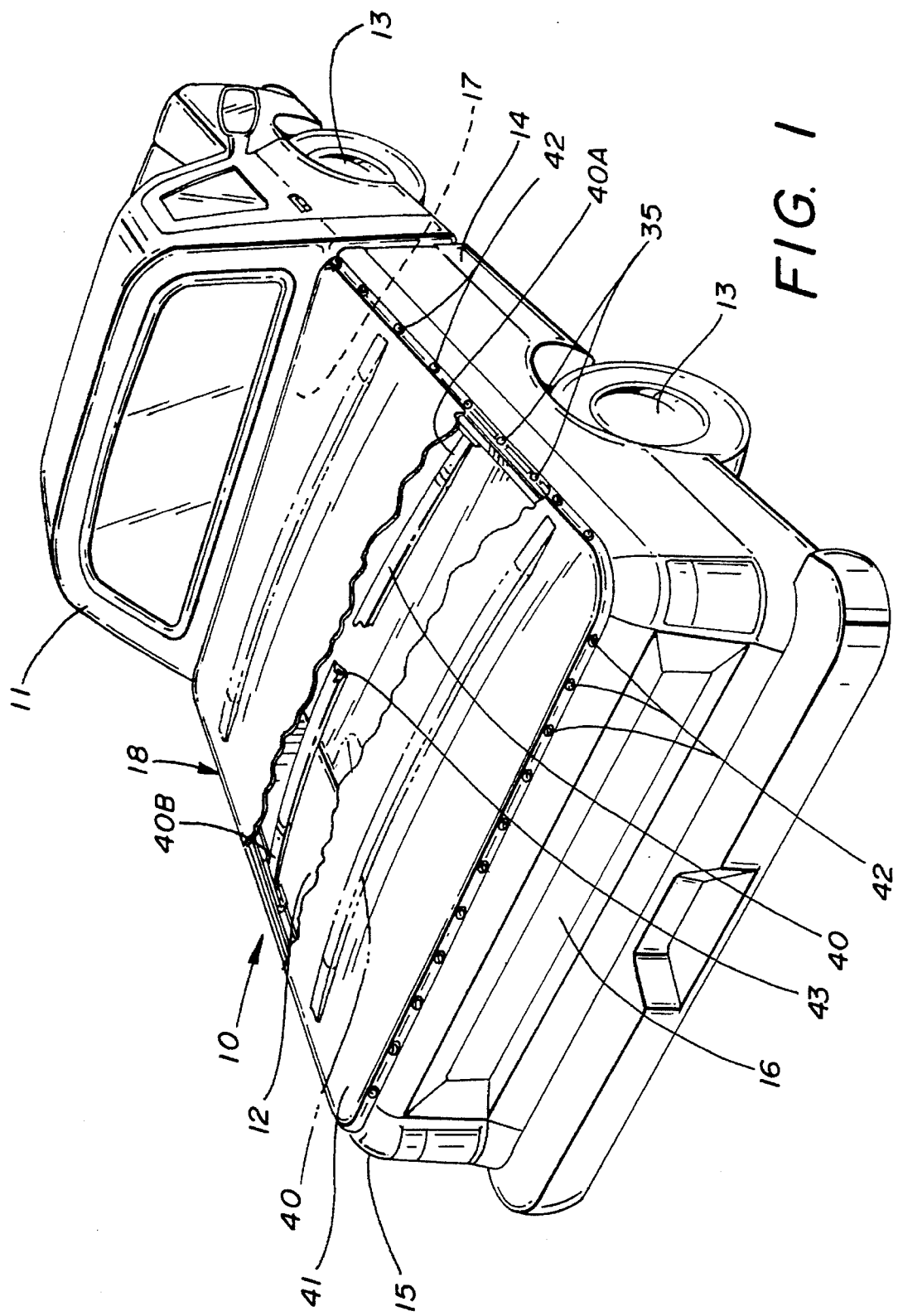
FIG. 1 is a perspective view of a pick-up truck with a tonneau cover and support frame with a portion removed.

Referring to FIG. 1 of the drawings, a pick-up truck 10 can be seen having a cab portion 11, a bed portion 12 and a wheel assembly 13. The bed portion 12 has oppositely disposed sidewalls 14 and 15 and a hinge tailgate 16. A front wall 17 extends between said respective sidewalls 14 and 15 adjacent the cab portion 11 hereinbefore described. A slant side rail tonneau support frame assembly 18 is positioned on the respective walls and tailgate 14, 15, 16, and 17 of the cargo bed portion 12.

Referring to FIGS. 2, 3, 5 and 8 of the drawings the frame assembly is comprised of a pair of metal extrusions oppositely disposed parallel elongated side rails 19 and 20 and a pair of spaced interconnecting end rail extrusions 21 and 22 secured together at their respective adjacent ends by 90 degree connecting fittings 23 to form a generally rectangular configuration on their respective side end and tailgate walls 14, 15, 16, and 17 of the truck bed portion 12.

Figure 2:
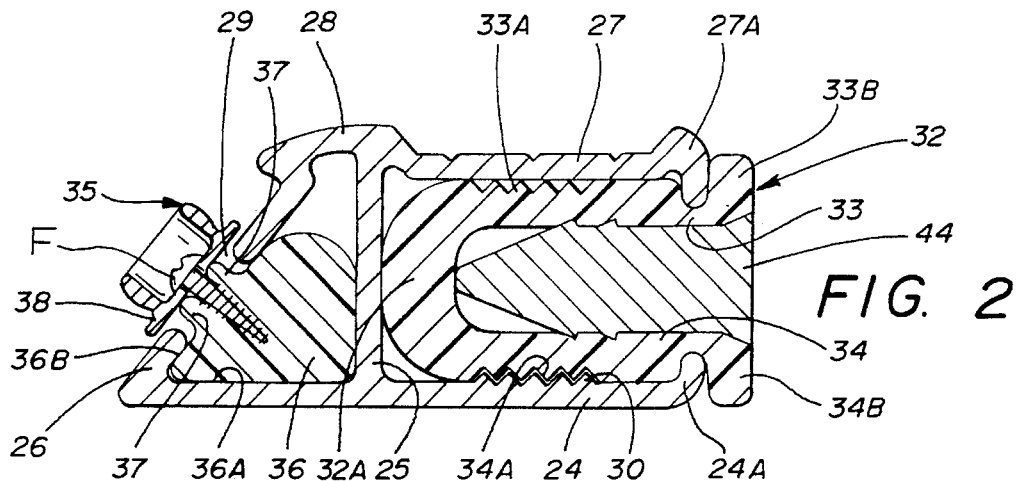
FIG. 2 is an enlarged cross-sectional view on lines 2—2 of FIG. 5.
Figure 3:
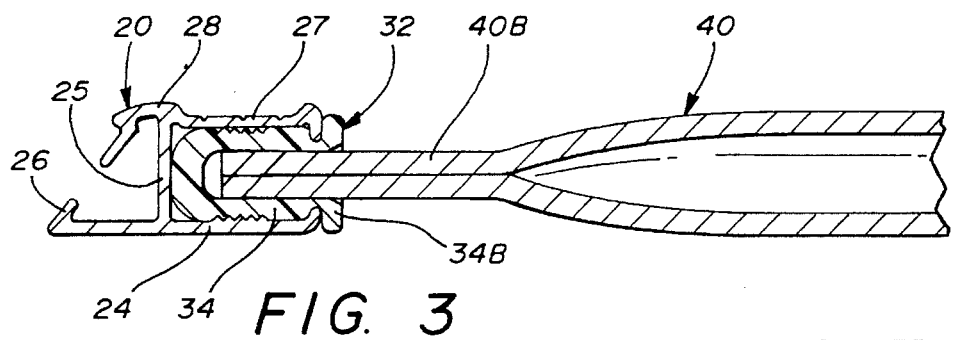
FIG. 3 is an enlarged cross-sectional view of a slant side rail and a portion of a cross bow positioned within.
Figure 4:
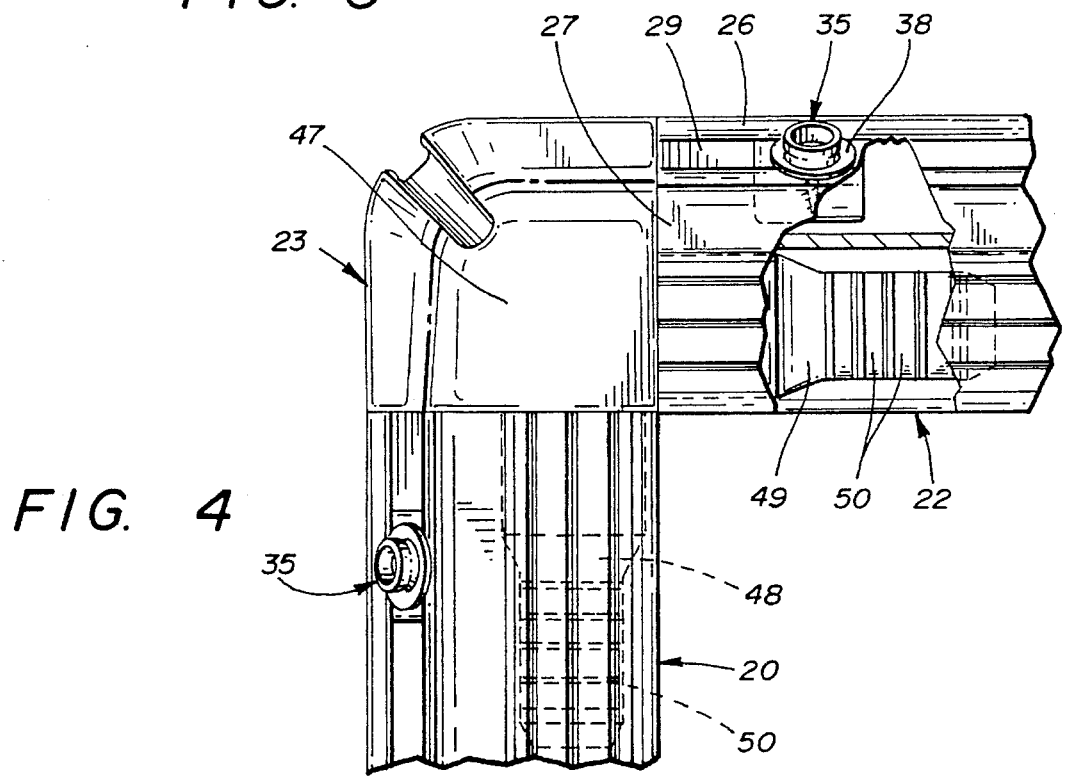
FIG. 4 is an enlarged partial top plan view of a corner section of the slant side rail assembly.
Figure 5:
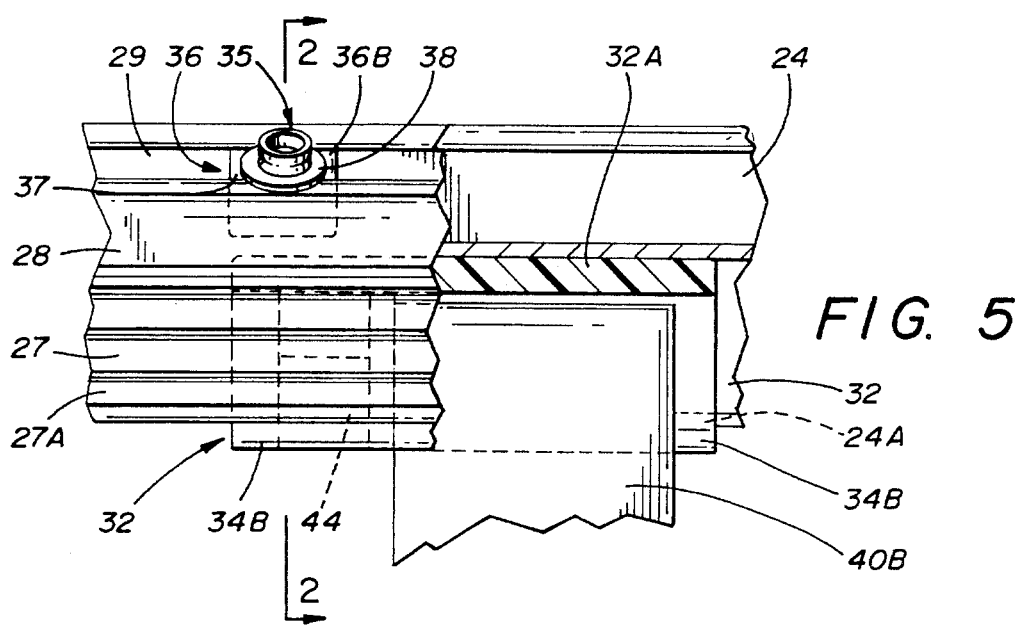
FIG. 5 is an enlarged top plan view of a rail portion having a cross bow extending therefrom.

Referring specifically to FIGS. 2, 3, and 4 of the drawings, it will be seen that each of the rails 19-22 are of an identical extrusion configuration having a base 24 with an upstanding wall 25 and an angular flange 26 extending therefrom. A top portion 27 is in spaced parallel relation to said base and is interconnected with said upstanding wall 25. An angularly extending offset flange 28 extends from said upstanding wall 25 defining an elongated channel opening therebetween at 29. The respective free ends of the top portion 27 and base 24 each have inturned opposing end flanges 27A and 24A respectively defining a bow engagement area therebetween. The base 24 has a plurality of parallel engagement ribs 30 on its upper surface that provide registering engagement with a correspondingly ribbed surface of a resilient bow mounted insert 32, best seen in FIGS. 2 and 3 of the drawings.

The resilient bow mounted insert 32 is of a cross-sectionally U-shaped body member having opposing parallel walls 33 and 34 with an interconnecting element 32A therebetween. The outer surface of said respective walls are longitudinally ribbed at 33A and 34A and have respective elongated positioning flanges 33B and 34B registerable with said hereinbefore described flanges 24A and 27A as will be well understood by those skilled in the art.

Referring now to FIGS. 2 and 4 of the drawings, a snap fastener insert 35 can be seen having a contoured synthetic resin monolithic mounting portion 36 with a flat base 36A and an angular side 36B. A pair of positioning ribs 37 are formed on the angular side 36B for proper vertical alignment of the snap fastener insert 35 which has an annular flange 38 extending therefrom which is registerable over the channel opening 29.

It will be apparent from the above description that the snap fastener insert 35 is so shaped as to be positioned within the end and side rails 19 and 22 between the respective upstanding wall 25 and the elongated channel opening 29 with the snap fastener insert 35 mounted thereon by a fastener F such that the snap fastener insert 35 can be locked into any desired position within and along the rails 19 through 22.

Referring to FIGS. 1, 3, 5 and 8 of the drawings, a plurality of cover support bows 40 are positioned transversely between said respective side rail frame portions 19 and 20 to provide cross bed support for a fabric cover 41 secured to the frame 18 by multiple snap fasteners 42 engageable on the respective snap fastener base 35 hereinbefore described. Each of the cover support bows 40 are comprised of a metal extrusion having a cross-sectionally triangular configuration indicated at 43 with the oppositely disposed end portions 40A and 40B being flattened inwardly therefrom, best seen in FIG. 3 of the drawing, for insertion into the selective resilient bow mounting inserts 32 in the respective opposing sidewalls 19 and 20.

Figure 6:
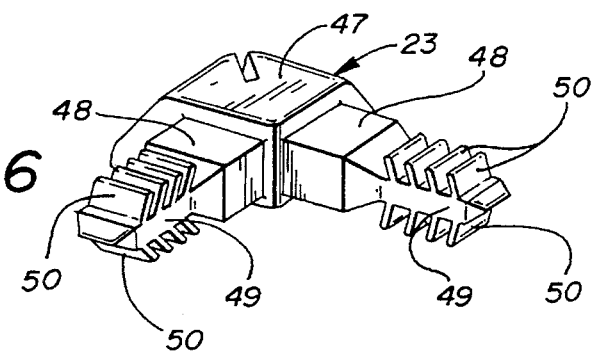
FIG. 6 is a perspective view of a rail corner connector.

In operation, the resilient bow mount inserts 32 are fitted within the side rails 19 and 20 in opposing longitudinally spaced relation to one another within the respective rails as hereinbefore described. Each of the resilient bow mounting inserts 32 is locked into its respective rail by use of a locking wedge 44, best seen in FIGS. 2, 5, and 6 of the drawings. The locking wedge 44 has a tapered engagement insert end portion 45 and an oppositely disposed impact base 46 for driving same into the bow mounting insert 32 within the respective rail 19 or 20 locking it in place. It will also be seen that the wedge 44 is positioned adjacent one end of the resilient bow mounting insert 32 so as to provide clearance for the insertion of the hereinbefore described flattened bow ends 40A or 40B as illustrated and best seen in FIG. 5 of the drawings.

Figure 7:
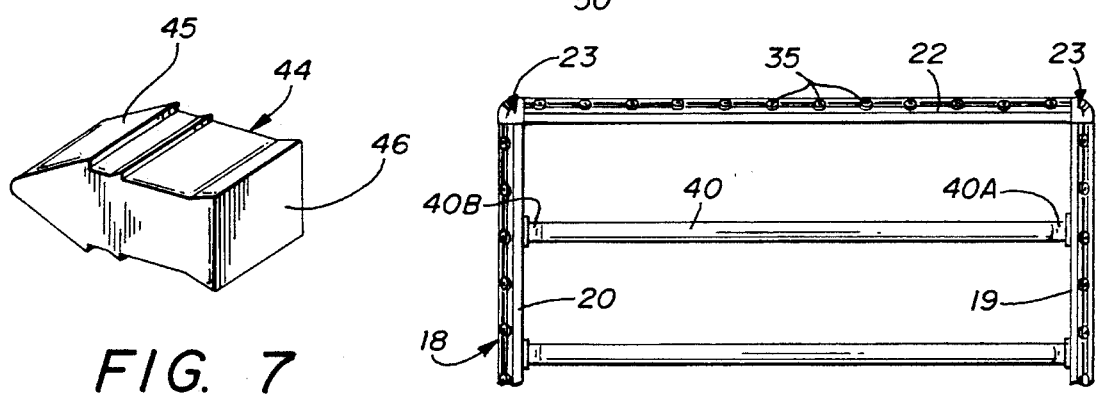
FIG. 7 is a perspective view of a bow mounting wedge.
Figure 8:
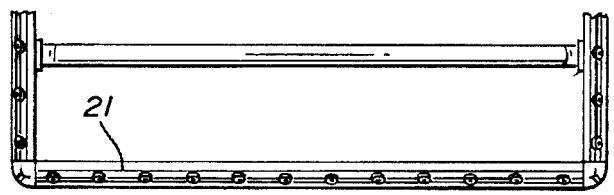
FIG. 8 is an assembly illustration of the rail frame and support cross bows.

Referring now to FIGS. 4, 7 and 8 of the drawings, the corner connector 23 is illustrated as having a contoured generally square main body member 47 that is exposed between the adjoining rail sections when in use. The body member 47 has a pair of insert fingers 48 extending at right angles, each of which has a reduced dimensional area at 49 extending inwardly from its respective free end. A plurality of angularly inclined locking tabs 50 extend in oppositely disposed relation from the upper and lower surfaces of the reduced dimensional area 49 transversely thereacross. Thus the locking tabs 50 along with the remaining portion of the finger insert 48 provides a friction fit within the respective rails 19 and 22 as best seen in FIG. 4 of the drawings. The corner connectors 23 are molded from synthetic resin material which allows for a slight deflection of the locking tabs when inserted into the metal extrusion rails as hereinbefore described. This also allows for selective removability of the connection inserts from the rails, if desired.

In operation, once the support frame assembly 18 is assembled and positioned on the cargo bed 13 with conventional means and the selective adjustable snap fasteners inserts 35 positioned and secured in the rails 19 and 20 depending on the registration positioning of the snap fasteners 42 on the flexible cover 41, the cover support bows 40 are then inserted into the respective opposing resilient bow mounting inserts 32 which have heretofore been positioned within the respective rails and secured by the locking wedge 44, the assembly is then ready to accept the cover 41.

The cover 41 is secured onto and over the slat portion of the supporting frame 18 with the multiplicity of longitudinally spaced snap fasteners 42 engaging the snap fasteners inserts 35 as best seen in FIG. 1 of the drawings.

Thus it will be seen that a new slant rail tonneau cover assembly has been illustrated and described and it will be apparent to those skilled in the art that various changes and modifications may be made therein without departing from the spirit of the invention.

Therefore I claim:

1. A slant rail tonneau cover assembly for use on pick-up truck beds, said truck beds including opposing sidewalls, a front wall and a pivotally supported tailgate; said slant rail tonneau cover comprising a main support frame, having pairs of oppositely disposed rails with connector elements therebetween, said rails comprising an elongated base, an upstanding wall defining a snap insert area and a bow insert area, said snap insert area having an angularly disposed elongated channel portion, an adjustable snap fastener assembly within said snap insert area, said adjustable snap fastener assembly comprising a monolithic resilient mounting portion, a snap fastener base secured to said monolithic mounting portion, and means for aligning said snap fastener base on said monolithic mounting portion, a bow mount insert assembly having a resilient U-shaped body member within said bow insert area, said bow mount insert assemblies within said opposing bow insert areas are aligned with one another, means for securing said bow mount insert in said bow insert area, support bows removably positioned between opposing bow mount insert assemblies of one of said opposing pairs of said rails.

2. The slant rail tonneau cover assembly of claim 1 wherein said means for securing said bow mount insert assembly within said bow insert area comprises a locking wedge.

3. The slant rail tonneau cover assembly of claim 1 wherein said support bow has a cross-sectionally triangular configuration and transversely flat end portions.

4. The slant rail tonneau cover assembly of claim 1 wherein said connector element comprises a main body member, insert fingers extending from said body member, a plurality of resilient locking tabs extending from said insert fingers said insert fingers being at right angles to one another.

\* \* \* \* \*